(12) United States Patent
Yamashita

(10) Patent No.: US 10,275,144 B2
(45) Date of Patent: Apr. 30, 2019

(54) INFORMATION PROCESSING DEVICE AND INFORMATION PROCESSING METHOD

(71) Applicant: Oki Data Corporation, Tokyo (JP)

(72) Inventor: Makoto Yamashita, Tokyo (JP)

(73) Assignee: Oki Data Corporation, Tokyo (JP)

( * ) Notice: Subject to any disclaimer, the term of this patent is extended or adjusted under 35 U.S.C. 154(b) by 454 days.

(21) Appl. No.: 14/750,583

(22) Filed: Jun. 25, 2015

(65) Prior Publication Data

US 2015/0378749 A1 Dec. 31, 2015

(30) Foreign Application Priority Data

Jun. 26, 2014 (JP) ................................ 2014-130979

(51) Int. Cl.
*H04N 1/00* (2006.01)
*G06F 9/451* (2018.01)
*G06F 3/0484* (2013.01)
*G06F 3/0488* (2013.01)

(52) U.S. Cl.
CPC ........ *G06F 3/0488* (2013.01); *G06F 3/04847* (2013.01); *G06F 9/453* (2018.02); *H04N 1/00411* (2013.01); *H04N 1/00474* (2013.01)

(58) Field of Classification Search
CPC .................................................. G06F 9/4446
See application file for complete search history.

(56) References Cited

U.S. PATENT DOCUMENTS

| | | | | |
|---|---|---|---|---|
| 5,828,374 A | * | 10/1998 | Coleman | G06F 3/04847 715/712 |
| 6,582,475 B2 | * | 6/2003 | Graham | G06F 17/241 715/234 |
| 2003/0172148 A1 | * | 9/2003 | Simpson | G06F 3/121 709/224 |
| 2005/0125729 A1 | * | 6/2005 | Lee | G06F 8/30 715/234 |
| 2006/0177136 A1 | * | 8/2006 | Windl | G06F 3/04847 382/189 |
| 2009/0190151 A1 | * | 7/2009 | Ogino | G06F 9/4446 358/1.13 |
| 2011/0055719 A1 | * | 3/2011 | Mori | G06F 3/0483 715/747 |

(Continued)

FOREIGN PATENT DOCUMENTS

| | | |
|---|---|---|
| JP | H02-135515 A | 5/1990 |
| JP | 2010-045423 A | 2/2010 |

(Continued)

*Primary Examiner* — William L Bashore
*Assistant Examiner* — Nathan K Shrewsbury
(74) *Attorney, Agent, or Firm* — Rabin & Berdo, P.C.

(57) ABSTRACT

An information processing device has a storage unit and a touch panel with a screen. The storage unit stores layout information indicating the positions at which various settings are displayed on the screen. The touch panel displays a setting selection screen on which the settings are arranged in the display positions indicated by the layout information, accepts selections of settings to be made, and displays help screens showing help information for each of the settings in an order corresponding to the display positions indicated by the layout information. The layout information can be altered to have the help information displayed in a desired order.

10 Claims, 11 Drawing Sheets

(56) References Cited

U.S. PATENT DOCUMENTS

| | | | | |
|---|---|---|---|---|
| 2011/0205582 A1* | 8/2011 | Hoshino | ............... | G06F 9/4446 |
| | | | | 358/1.15 |
| 2011/0242561 A1* | 10/2011 | Nitta | ................... | G06F 3/04886 |
| | | | | 358/1.9 |
| 2012/0075322 A1* | 3/2012 | Hathaway | ............. | G06T 11/206 |
| | | | | 345/589 |
| 2014/0019914 A1* | 1/2014 | Amano | ................. | G06F 3/0482 |
| | | | | 715/825 |
| 2014/0089840 A1* | 3/2014 | Nakagawa | ............ | G06F 3/0488 |
| | | | | 715/777 |
| 2014/0173474 A1* | 6/2014 | Klemenz | ............... | G06F 9/4446 |
| | | | | 715/765 |
| 2014/0372886 A1* | 12/2014 | Ramasubramanian | ....................... | |
| | | | | G06F 9/4446 |
| | | | | 715/705 |
| 2015/0334254 A1* | 11/2015 | Kinoshita | ............. | G06F 9/4446 |
| | | | | 358/1.15 |

FOREIGN PATENT DOCUMENTS

| | | |
|---|---|---|
| JP | 2012-004795 A | 1/2012 |
| JP | 2012-174023 A | 9/2012 |

\* cited by examiner

INFORMATION PROCESSING DEVICE AND INFORMATION PROCESSING METHOD

BACKGROUND OF THE INVENTION

1. Field of the Invention

This invention relates to an information processing device and an information processing method, more particularly to the display of help information.

2. Description of the Related Art

Helping the user of an information processing device equipped with a touch panel by providing help information that explains the functions of the device is a known art. In Japanese Patent Application Publication No. 2012-174023, for example, Nakamura discloses a portable terminal device that shifts the focus among the functions displayed on the screen at fixed time intervals by responding to the continued pressing of a particular button and displays the help information for the focused function.

This known technique is inconvenient, however, when the user wants to view the help information for the functions and settings displayed on the screen in a particular order.

An object of the present invention is to enable the help information for a plurality of settings to be displayed in the desired order.

SUMMARY OF THE INVENTION

In one embodiment of the invention, an information processing device has a storage unit for storing layout information indicating display positions of settings on a screen. A display unit displays a setting selection screen on which the settings are arranged in the display positions indicated by the layout information, accepts selections of settings to be made, and displays help screens showing help information for each of the settings in an order corresponding to the display positions indicated by the layout information.

In another embodiment of the invention, an information processing method includes displaying a setting selection screen on which settings are arranged in display positions indicated by layout information, and displaying help screens for each of the settings in an order corresponding to the display positions indicated by the layout information.

According to the embodiments of the invention, when the help information for each of the settings, the help information can be displayed in a desired order.

DETAILED DESCRIPTION OF THE INVENTION

Figure 1:
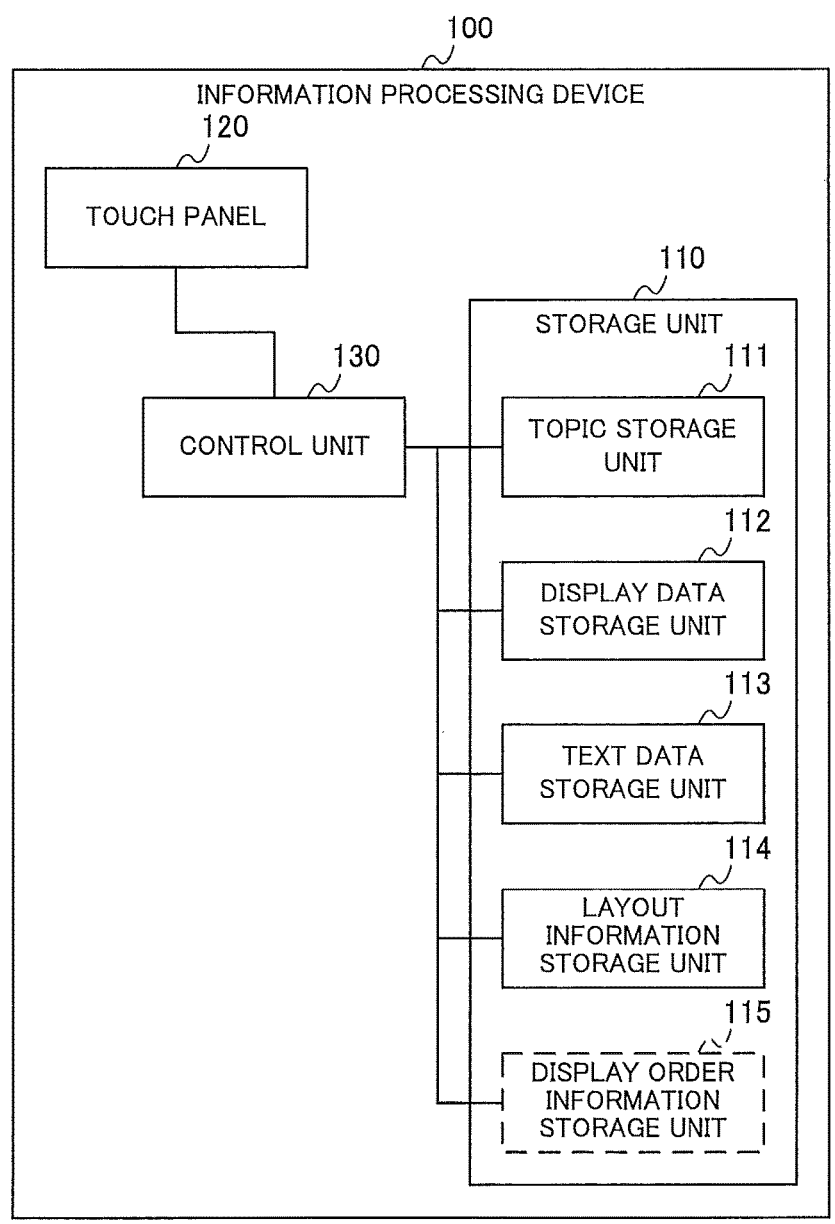
FIG. 1 is a block diagram schematically showing the configuration of an information processing device according to an embodiment of the invention.

FIG. 1 is a block diagram showing the schematic configuration of an information processing device 100 according to an embodiment of the invention. This information processing device 100 carries out an information processing method that is likewise an embodiment of the invention. The information processing device 100 includes a storage unit 110, a touch panel 120, and a control unit 130.

The storage unit 110 stores information required for processing in the information processing device 100. The storage unit 110 includes a topic storage unit 111, a display data storage unit 112, a text data storage unit 113, a layout information storage unit 114, and a display order information storage unit 115.

The topic storage unit 111 stores topic information indicating help topics corresponding to settings.

The display data storage unit 112 stores display data for displaying screens on the touch panel 120. The display data include, for example, a program for drawing a screen to be displayed on the touch panel 120 and partial image data incorporated in the screen.

The text data storage unit 113 stores text data providing the help information to be displayed corresponding to each help topic.

The layout information storage unit 114 stores layout information indicating the display positions of a plurality of settings on a setting selection screen.

The display order information storage unit 115 stores display order information indicating the order of display of the help topics corresponding to the display positions indicated by the layout information stored in the layout information storage unit 114. The display order information storage unit 115 may be a volatile storage unit.

The layout information stored in the layout information storage unit 114 and the display order information stored in the display order information storage unit 115 are updated by the control unit 130 in response to operations performed by the user.

The touch panel 120 serves as both a display unit for displaying screens and an input unit for accepting input. For example, the touch panel 120 displays screens based on image data generated by the control unit 130 and detects positions at which it is touched by means of a resistive film (when the touched position represents a control button, the term 'press' will often be used below instead of 'touch'). One specific screen displayed by the touch panel 120 is a setting selection screen on which buttons representing a plurality of settings are arranged at display positions indicated by the layout information stored in the layout information storage unit 114; touch input that selects a setting to be made is accepted on this screen. The touch panel 120 also displays help screens showing each item of help information for each setting in an order corresponding to the display positions indicated by the layout information stored in the layout information storage unit 114. This order is determined by the display order information stored in the display order information storage unit 115. The touch panel 120 also displays a display position alteration screen on which it accepts touch input of commands to alter the positions at which the settings are displayed.

The control unit 130 controls the processing performed by the information processing device 100. For example, the control unit 130 uses the display data stored in the display data storage unit 112 to generate image data, sends the image data to the touch panel 120 to display a screen based on the data, and accepts touch input from the screen. The control unit 130 thereby controls screen transitions on the touch panel 120, and controls the execution of functions by a function execution unit (not shown) on the basis of user input. In response to input to the touch panel 120, the control unit 130 also causes the touch panel 120 to display help screens. The non-illustrated function execution unit may be, for example, an image forming unit for forming images on paper or other media.

Figure 2:
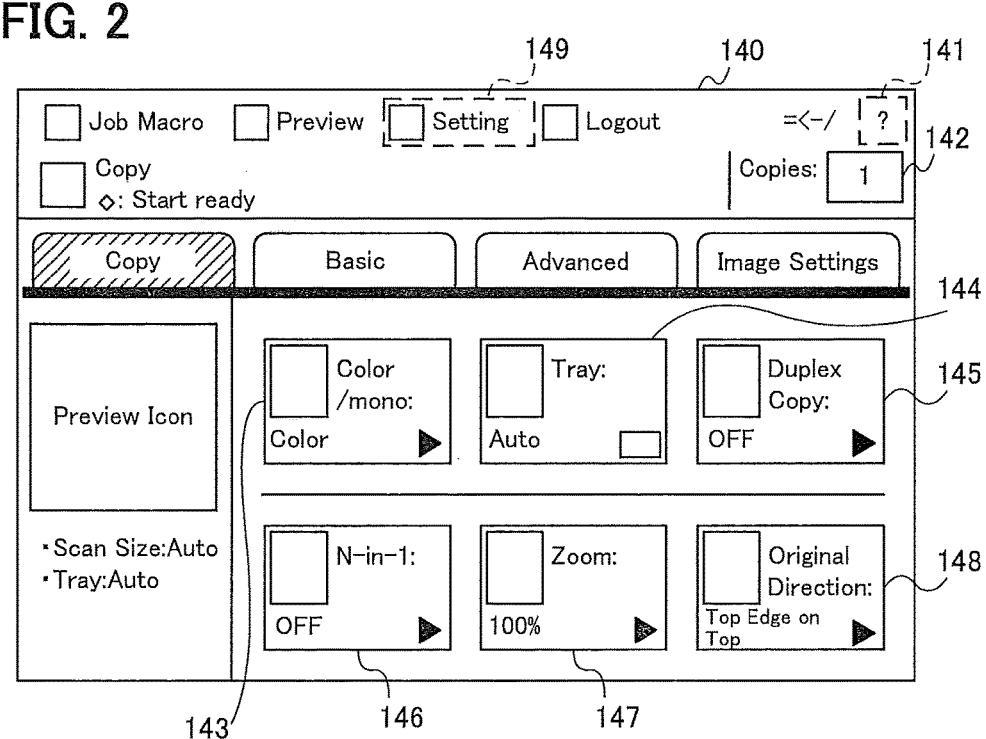
FIG. 2 schematically shows a first exemplary setting selection screen in the embodiment.

An exemplary setting selection screen for a copy function, as displayed on the touch panel 120, is shown schematically in FIG. 2.

The illustrated setting selection screen 140 for the copy function includes a help button 141 that provides a region (help command input region) on which a command to display a help screen is input, a number of copies display region 142, and setting buttons 143-148 that provide regions for selecting settings associated with the copy function.

When the help button 141 is pressed, the control unit 130 generates image data for displaying the help screen for the settings in the order corresponding to the display positions of the settings on the setting selection screen 140. The control unit 130 sends the generated image data to the touch panel 120 and causes the touch panel 120 to display the help screen.

The number of copies display region 142 is a region for displaying the number of copies. When an integer number is input with a non-illustrated numeric keypad, the control unit 130 causes the input integer number to be displayed in the number of copies display region 142.

When one of the setting buttons 143-148 is pressed, the control unit 130 generates image data for displaying the setting screen for the setting corresponding to the pressed one button. The control unit 130 sends the generated image data to the touch panel 120 and causes the touch panel 120 to display the setting screen for the selected setting. As described below, the user can alter the assignment of the settings to the setting buttons 143-148.

A setting button 149 is a region (display position alteration command input region) for inputting the command to alter the display positions of the settings on the setting selection screen 140. More specifically, when setting button 149 is pressed, the touch panel 120 displays a display position alteration screen for altering any settings assigned to the setting buttons 143-148.

Figure 3:
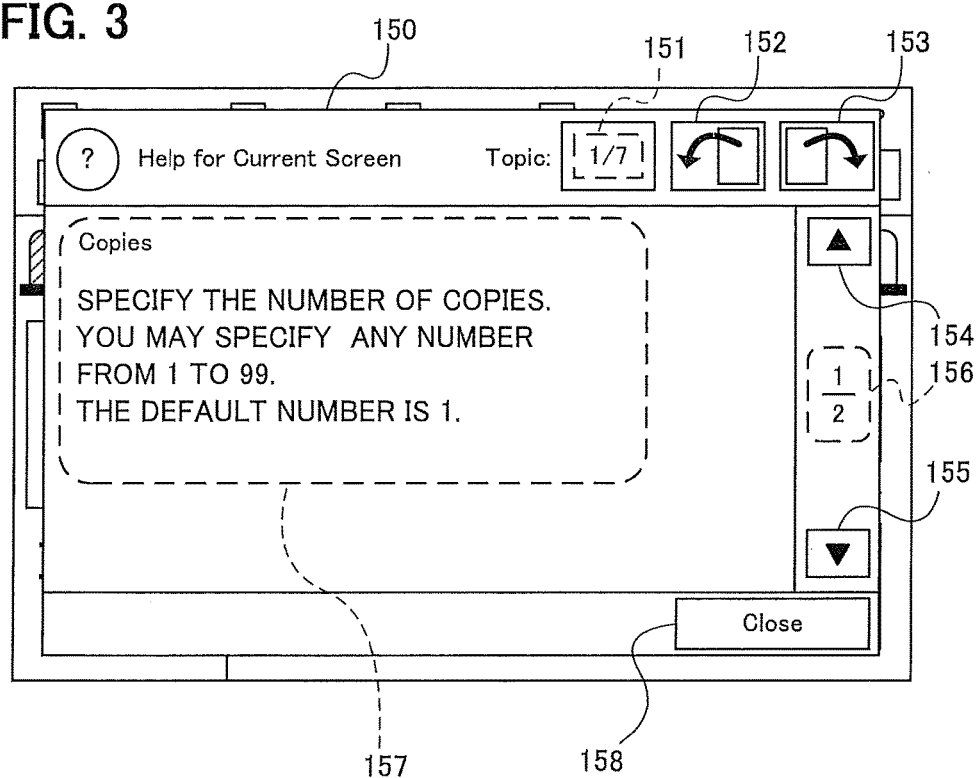
FIG. 3 schematically shows a first exemplary help screen in the embodiment.

An exemplary help screen displayed on the touch panel 120 is shown schematically in FIG. 3.

The illustrated help screen 150 includes a help topic indicator region 151, a preceding help button 152, a next help button 153, a preceding page button 154, a next page button 155, a page indicator region 156, a help display region 157, and a Close button 158.

The help topic indicator region 151 indicates the total number of help topics and the number that identifies the currently displayed help topic and indicates its position in the help topic display sequence. In this embodiment, smaller numbers are assigned to help topics that are displayed earlier in the sequence.

The preceding help button 152 is a region (preceding help region) for input of a command to display the help topic with the number one less than the number of the currently displayed help topic. Furthermore, when there is no help topic with the number one less than the number of the currently displayed help topic, the preceding help button 152 may be formed in a way that it cannot be pressed, such as in a way of a grayout state, or may be omitted so that it cannot be pressed.

The next help button 153 is a region (next help region) for input of a command to display the help topic with the number one greater than the number of the currently displayed help topic. Furthermore, when there is no help topic with the number one greater than the number of the currently displayed help topic, the next help button 153 may be formed in a way that it cannot be pressed, such as in a way of a grayout state, or may be omitted so that it cannot be pressed.

The preceding page button 154 is a region (preceding page region) for input of a command to display the page immediately preceding the currently displayed page of the currently displayed help topic. Furthermore, when there is no page with immediately preceding the currently displayed page of the currently displayed help topic, the preceding page button 154 may be formed in a way that it cannot be pressed, such as in a way of a grayout state, or may be omitted so that it cannot be pressed.

The next page button 155 is a region (next page region) for input of a command to display the next page following the currently displayed page of the currently displayed help topic. Furthermore, when there is no next page following the currently displayed page of the currently displayed help topic, the next page button 155 may be formed in a way that it cannot be pressed, such as in a way of a grayout state, or may be omitted so that it cannot be pressed.

The page indicator region 156 indicates the total number of pages in the currently displayed help topic and the page number of the currently displayed page.

The help display region 157 is the region in which the help information is displayed. The help information is a text message giving information such as the specifications of the relevant setting and rules for its use. A text message of this type is stored in the text data storage unit 113 for each setting.

The Close button 158 is a region for input of a command to close the help screen 150.

In this embodiment, after the help screen 150 for help information of the number of the copies display region 142 shown in FIG. 2 is displayed first, the corresponding help screens are displayed in the display order of setting buttons 143-148 shown in FIG. 2.

Figure 4:
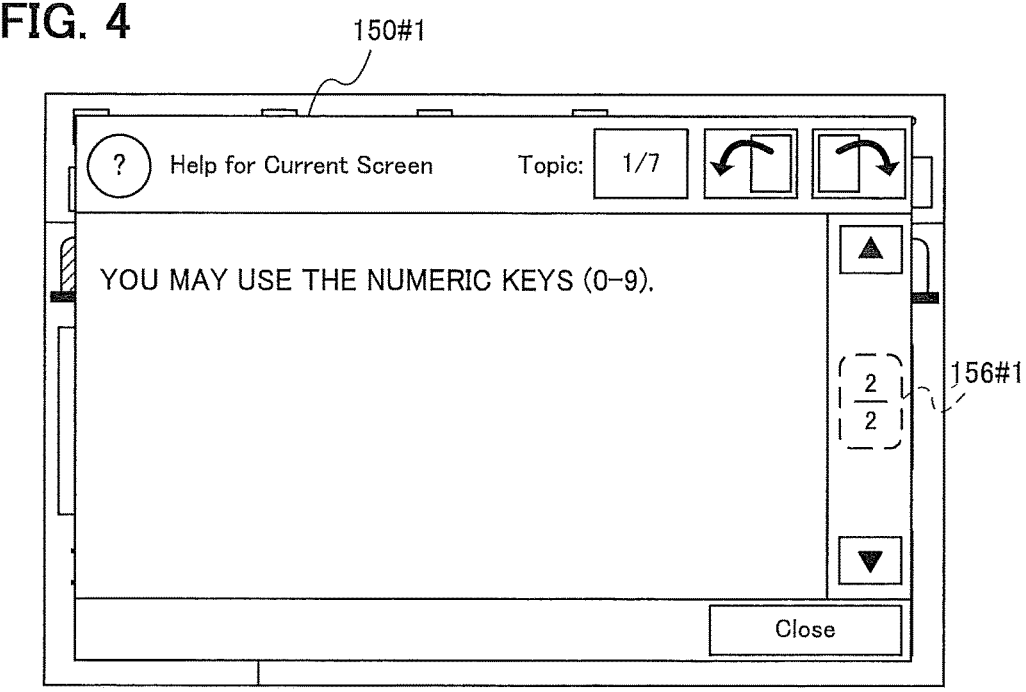
FIG. 4 schematically shows a second exemplary help screen in the embodiment.

FIG. 4 schematically shows an exemplary help screen displayed on the touch panel 120 when the next page button 155 is pressed on the help screen 150 shown in FIG. 3.

The page number displayed in the page indicator region 156#1 of the help screen 150#1 shown in FIG. 4 has increased by one from the number on the help screen 150 shown in FIG. 3.

Figure 5:
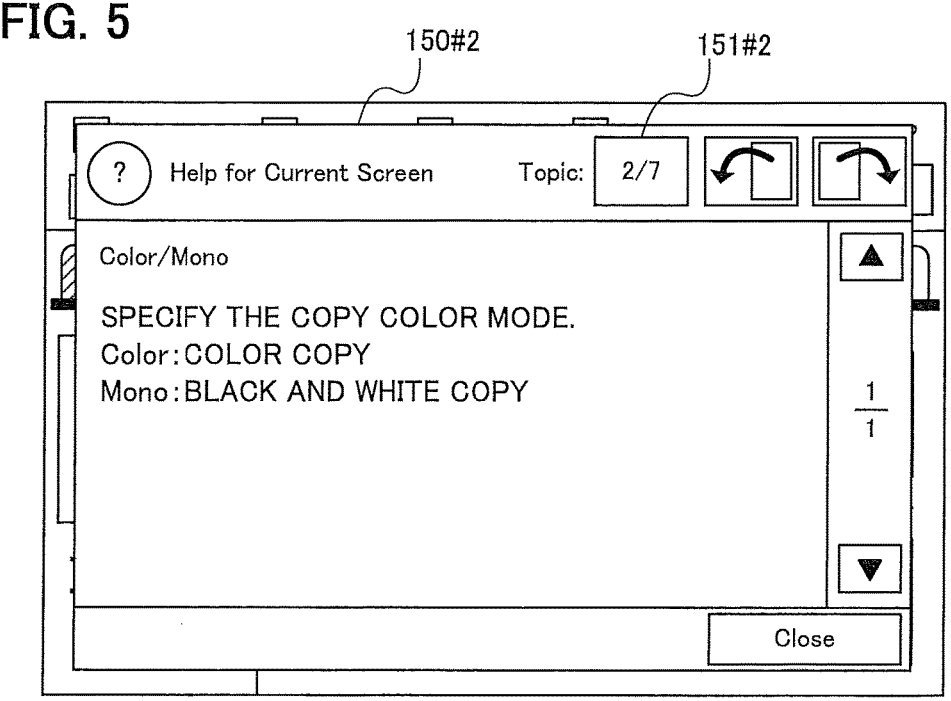
FIG. 5 schematically shows a third exemplary help screen in the embodiment.

FIG. 5 schematically shows an exemplary help screen displayed on the touch panel 120 when the next help button 153 is pressed in the help screen 150 shown in FIG. 3.

The number displayed in the help topic indicator region 151#2 of the help screen 150#2 shown in FIG. 4 has increased by one from the number on the help screen 150 shown in FIG. 3.

As shown in FIGS. 3 to 5, the touch panel 120 displays help information for each of the settings on a single help screen. When all the help information cannot be displayed on the single screen, it is divided into multiple pages, and each divided portion of the help information is displayed on a single help screen.

Figure 6:
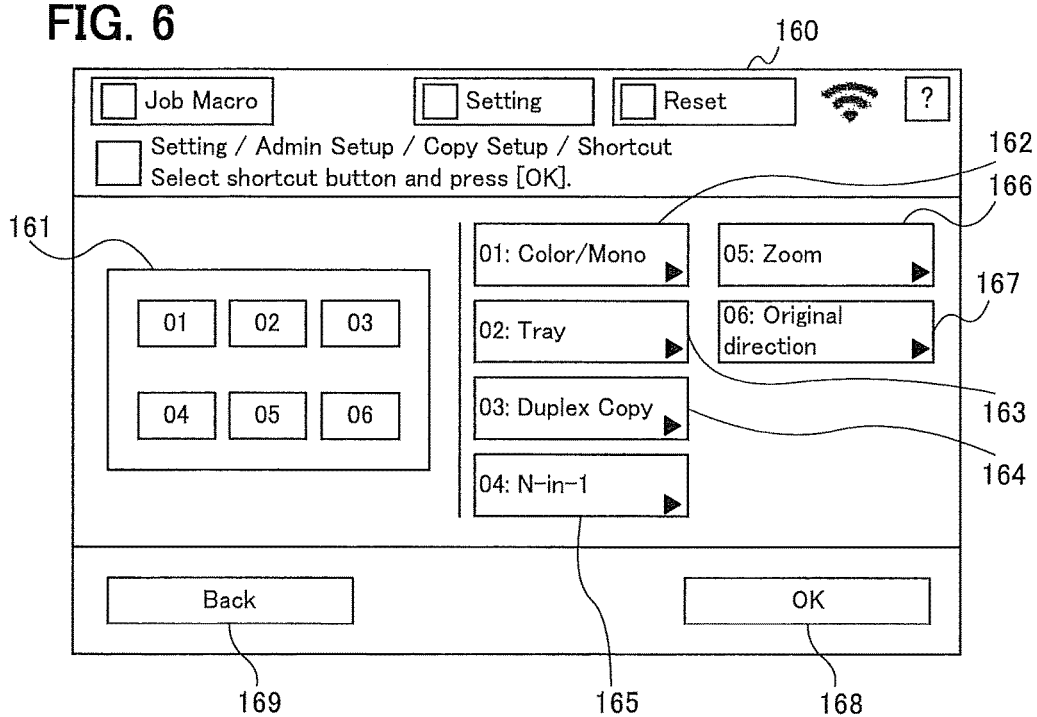
FIG. 6 schematically shows a first exemplary setting alteration screen in the embodiment.

FIG. 6 schematically shows an exemplary setting button designation screen displayed on the touch panel 120 to alter the setting assigned to a setting button.

The illustrated setting button designation screen 160 includes a layout position indicator region 161, setting button designation buttons 162-167, an OK button 168, and a Back button 169.

The setting button designation screen 160 shown in FIG. 6 is the screen displayed when the Setting button 149 is pressed (touched) on the setting selection screen 140 in FIG. 2.

The layout position indicator region 161 is a region showing the display positions, on the setting selection screen 140, of the setting buttons designated by the setting button designation buttons 162-167. In the example in FIG. 6, identification numbers assigned to the setting button designation buttons 162-167 are displayed at the positions at which the corresponding setting buttons are located on the setting selection screen 140.

The setting button designation buttons 162-167 are regions for input of commands designating the setting button that is to be altered. The identification numbers assigned to the setting button designation buttons 162-167 identify the corresponding setting buttons.

The OK button 168 is a region for input of a command that confirms an alteration and closes the setting button designation screen. When the OK button 168 is pressed, the control unit 130 updates the layout information stored in the layout information storage unit 114 according to the alteration designated on the setting button designation screen 160.

The Back button 169 is a region for input of a command that cancels the alteration and closes the setting button designation screen.

Figure 7:
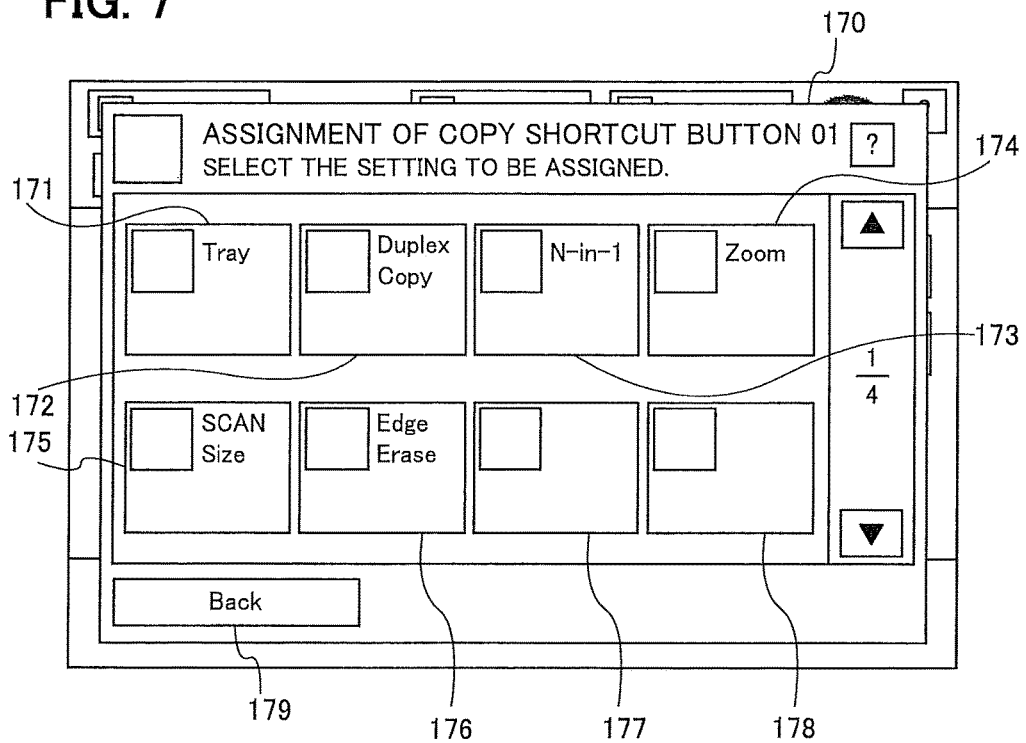
FIG. 7 schematically shows an exemplary setting alteration screen in the embodiment.

FIG. 7 schematically shows an exemplary setting alteration screen displayed on the touch panel 120 to alter a setting assigned to a setting button.

FIG. 7 shows a setting alteration screen 170 displayed when, for example, the setting button designation button 162 to which identification number '01' is assigned is pressed in FIG. 6.

As shown, the setting alteration screen 170 includes setting selection buttons 171-178 and a Back button 179.

The setting selection buttons 171-178 are regions for input of commands that select a setting to be associated with a selected setting button. A setting is assigned to each of the setting selection buttons 171-178. When one of the setting selection buttons 171-178 is pressed, the control unit 130 associates the setting button selected on the setting button designation screen 160 shown in FIG. 6 with the setting assigned to the pressed button. The setting selection buttons 171-178 for settings already assigned to setting buttons 143-148 on the setting selection screen 140 cannot be pressed.

The Back button 179 is a region for input of a command to return to the setting button designation screen 160 shown in FIG. 6.

The setting button designation screen 160 as shown in FIG. 6 and the setting alteration screen 170 as shown in FIG. 7 constitute the display position alteration screen for accepting the input of a command for altering the display positions of the plurality of settings.

Figure 8:
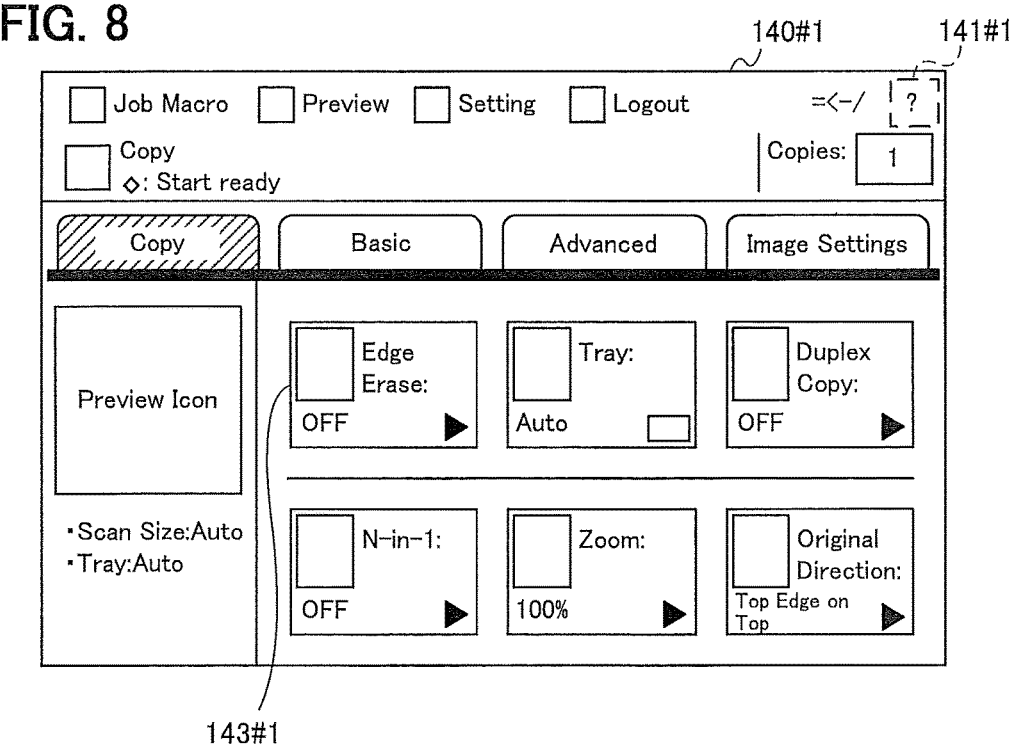
FIG. 8 schematically shows a second exemplary setting selection screen in the embodiment.

FIG. 8 schematically shows another exemplary setting selection screen displayed for the copy function on the touch panel 120.

The setting selection screen 140#1 for the copy function shown in FIG. 8 is displayed after the setting selection button 176 assigned to the edge erase setting is pressed on the setting alteration screen 170 shown in FIG. 7.

As shown, on the setting selection screen 140#1 for the copy function, the setting assigned to setting button 143#1 has been altered to the 'Edge Erase' setting for erasing edges.

In the description that follows, pressing a button is equivalent to input of an 'execute' command designating the region where the button is located.

Figure 9:
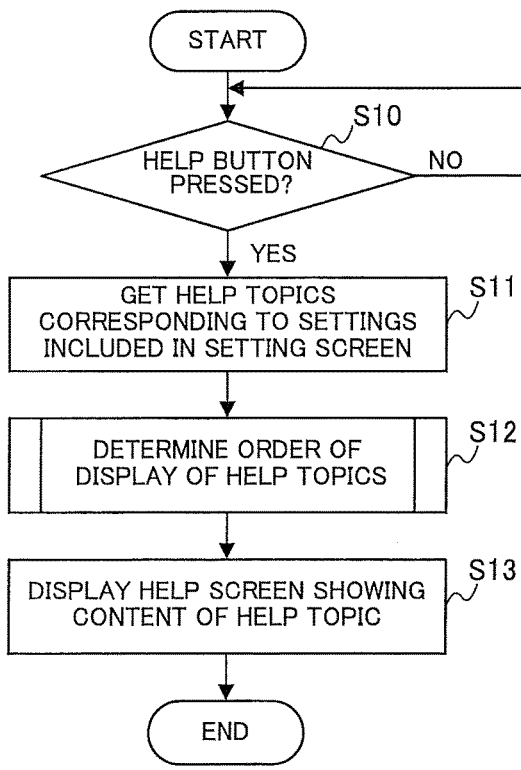
FIG. 9 is a flowchart illustrating a process that displays a help screen in the embodiment.

FIG. 9 is a flowchart illustrating the operation of displaying a help screen in the embodiment.

It will be assumed that the setting selection screen 140 for the copy function is displayed on the touch panel 120 as shown in FIG. 2.

First, the control unit 130 determines whether or not the help button 141 has been pressed on the setting selection screen 140 for the copy function (S10). When the help button 141 is pressed (Yes in step S10), the process proceeds to step S11.

In step S11, the control unit 130 gets the help topics corresponding to the settings included in the setting selection screen 140 for the copy function from the topic information stored in the topic storage unit 111. Specifically, the control unit 130 gets the help topics corresponding to the setting buttons 143-148 displayed on the setting selection screen 140 for the copy function.

Next, on the basis of the layout information stored in the layout information storage unit 114, the control unit 130 identifies the layout positions of the settings; then, from the layout positions, it determines the order of display of the help topics (S12). The process of determining the order of display of the help topics will be described in detail with reference to FIG. 10. The control unit 130 stores display order information indicating the determined display order in the display order information storage unit 115.

Using the display data stored in the display data storage unit 112 and the text data stored in the text data storage unit 113, and following the display order determined in step S12, the control unit 130 generates image data for the help screen corresponding to the help topic to be currently displayed. The control unit 130 then sends the generated image data to the touch panel 120 to display the help screen based on the image data (S13).

Figure 10:
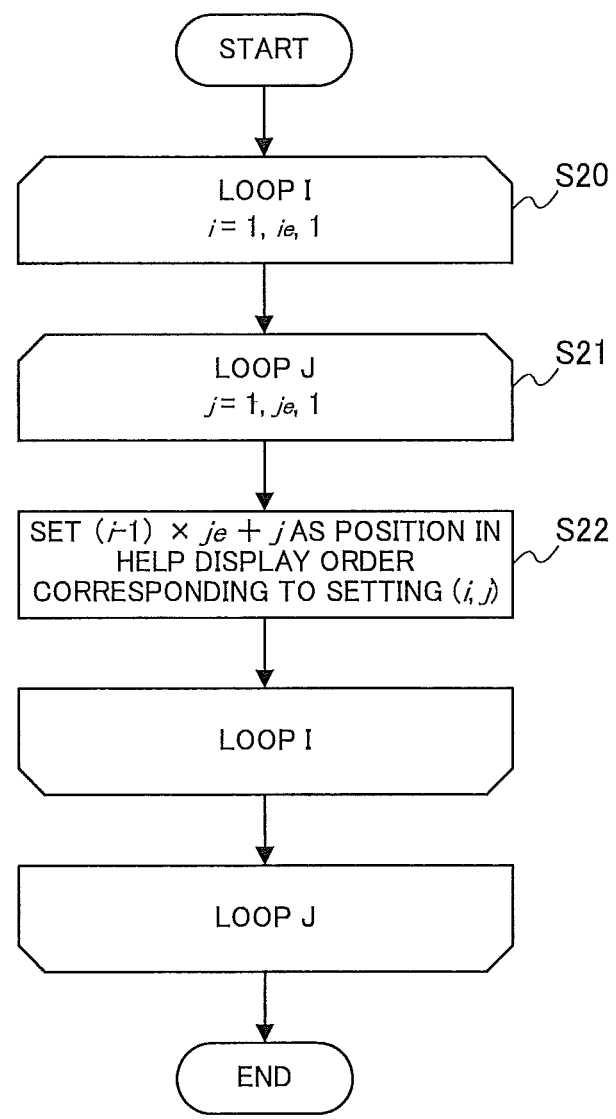
FIG. 10 is a flowchart illustrating a process that alters the order of display of help topics in the embodiment.

FIG. 10 is a flowchart illustrating the process of determining the order of display of the help topics in the embodiment.

The letters 'ie' here represent the number of rows on which the setting buttons 143-148 are located on the setting selection screen 140 for the copy function. The letter 'i' is a row number indicating the row on which one of the setting buttons 143-148, corresponding to the help topic for which the order of display is being calculated, is located on the setting selection screen 140 for the copy function; 'i' varies from 1 to ie (1≤i≤ie). The letters 'je' represent the number of columns in which the setting buttons 143-148 are located on the setting selection screen 140 for the copy function. The letter 'j' is a column number indicating the column in which one of the setting buttons 143-148, corresponding to the help topic for which the order of display is being calculated, is located on the setting selection screen 140 for the copy function; 'j' varies from 1 to je (1≤j≤je).

The control unit 130 iterates steps S21 and S22 until 'i' reaches 'ie', starting from the default value of '1', with an increment value of '1' (S20).

During each iteration of this loop, the control unit 130 repeats step S22 until 'j' reaches 'je', starting from the default value of '1', with an increment value of '1' (S21).

In step S22, the control unit 130 uses the following expression (1) to determine the order of display of the help topic corresponding to one of the setting buttons 143-148 located in the row identified by 'i' and column identified by 'j' on the setting selection screen 140 for the copy function.

$$\{(i-1) \times je\} + j \quad (1)$$

By following the flowchart shown in FIG. 10, the control unit 130 determines the order of display of each help topic from the position at which the button to which the corresponding setting is assigned is displayed on the setting selection screen. Therefore, if the user customizes the setting selection screen by arranging the buttons corresponding to the settings in a desired order, the help screens for the settings will also be displayed in the desired order. If the buttons are arranged in order of frequency of use, for example, the help screens for frequently used settings will be displayed before the help screens for other settings.

Figure 11:
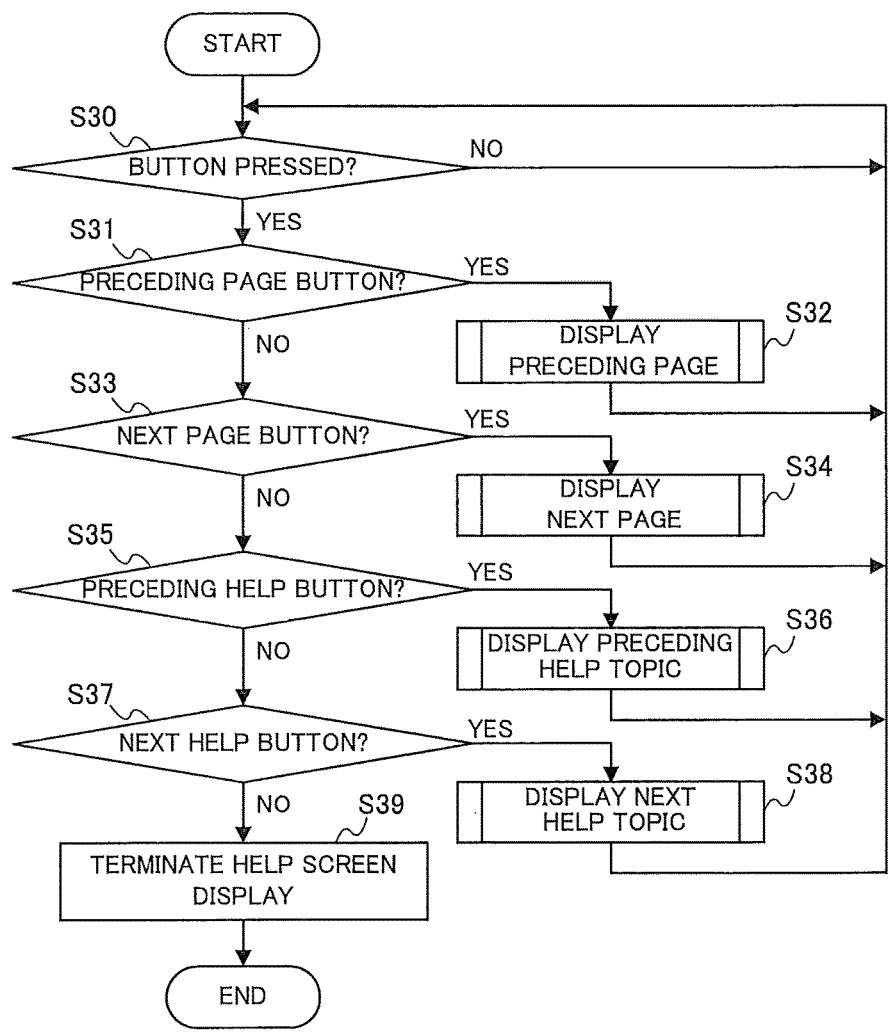
FIG. 11 is a flowchart illustrating responses to operations performed on a help screen in the embodiment.

FIG. 11 is a flowchart illustrating operations performed on a help screen in the embodiment.

It will be assumed that the help screen 150 shown in FIG. 3 is displayed on the touch panel 120.

First, the control unit 130 determines whether or not any one of the buttons has been pressed on the help screen 150 (S30). When one of the buttons is pressed (Yes in step S30), the process proceeds to step S31.

In step S31, the control unit 130 determines whether or not the pressed button is the preceding page button 154. If the pressed button is the preceding page button 154 (Yes in step S31), the process proceeds to step S32; if the pressed button is not the preceding page button 154 (No in step S31), the process proceeds to step S33.

In step S32, the control unit 130 performs the preceding page display process. This process will be described with reference to FIG. 12. The process then returns to step S30.

In step S33, the control unit 130 determines whether or not the pressed button is the next page button 155. If the pressed button is the next page button 155 (Yes in step S33), the process proceeds to step S34; if the pressed button is not the next page button 155 (No in step S33), the process proceeds to step S35.

In step S34, the control unit 130 performs the next page display process. This process will be described with reference to FIG. 13. The process then returns to step S30.

In step S35, the control unit 130 determines whether or not the pressed button is the preceding help button 152. If the pressed button is the preceding help button 152 (Yes in step S35), the process proceeds to step S36; if the pressed button is not the preceding help button 155 (No in step S35), the process proceeds to step S37.

In step S36, the control unit 130 performs the preceding help display process. This process will be described with reference to FIG. 14. The process then returns to step S30.

In step S37, the control unit 130 determines whether or not the pressed button is the next help button 153. If the pressed button is the next help button 153 (Yes in step S37), the process proceeds to step S38; if the pressed button is not the next help button 153 (No in step S37), the process proceeds to step S39.

In step S38, the control unit 130 performs the next help display process. This process will be described with reference to FIG. 15. The process then returns to step S30.

In step S39, since the pressed button is the Close button 158, the control unit 130 terminates the display of the help screen 150, and displays the setting selection screen 140 for the copy function shown in FIG. 2 on the touch panel 120.

Figure 12:
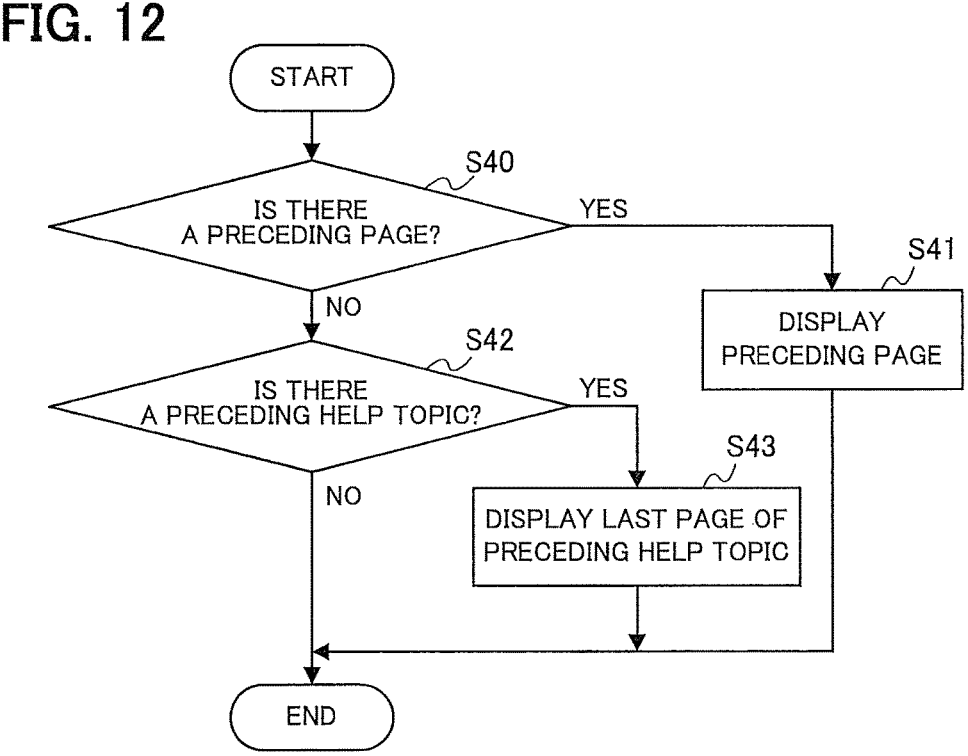
FIG. 12 is a flowchart illustrating a process performed to display a preceding page in the embodiment.

FIG. 12 is a flowchart illustrating the preceding page display process in the embodiment.

The control unit 130 determines whether the currently displayed help topic has a preceding page (S40). For example, when the control unit 130 generates the image data for the help screen 150 shown in FIG. 3 on the basis of the display data stored in the display data storage unit 112 and text data stored in the text data storage unit 113. In the process, from the size of the help display region 157 in the help screen 150, the control unit 130 determines the number of pages to display the help information indicated by the text data stored in the text data storage unit 113 for each help topic. The control unit 130 can therefore determine the presence of a preceding page from the help information currently displayed in the help display region 157, or from the total number of pages and page number indicated in the page indicator region 156. Specifically, when the currently displayed help topic consists of a plurality of pages and the second page or a later page is displayed, the control unit 130 decides that the currently displayed help topic has a preceding page (Yes in step S40) and the process proceeds to step S41. If the help topic does not have a preceding page (No in step S40), the process proceeds to step S42.

In step S41, the control unit 130 generates the image data for the preceding page of the currently displayed help topic. The control unit 130 then sends the generated image data to the touch panel 120 to display the help screen for the preceding page.

In step S42, the control unit 130 determines whether or not there is a help topic earlier in the order of display than the currently displayed help topic. The control unit 130 performs this determination, for example, by referring to the display order information stored in the display order information storage unit 115. If there is a help topic earlier in the order of display than the currently displayed help topic (Yes in step S42), the process proceeds to step S43.

In step S43, the control unit 130 generates image data for the help screen corresponding to the last page of the help topic one position earlier in the order of display than the currently displayed help topic. The control unit 130 then sends the generated image data to the touch panel 120 to display that help screen.

Alternatively, in step S43, the control unit 130 may generate image data for the help screen corresponding to the first page of the help topic one position earlier in the order of display than the currently displayed help topic and send the generated image data to the touch panel 120.

In addition, when there is no help topic earlier in the order of display than the currently displayed help topic (No in step S42), the control unit 130 may generate image data for the help screen corresponding to the first or last page of the last help topic in the order of display and send the generated image data to the touch panel 120.

Figure 13:
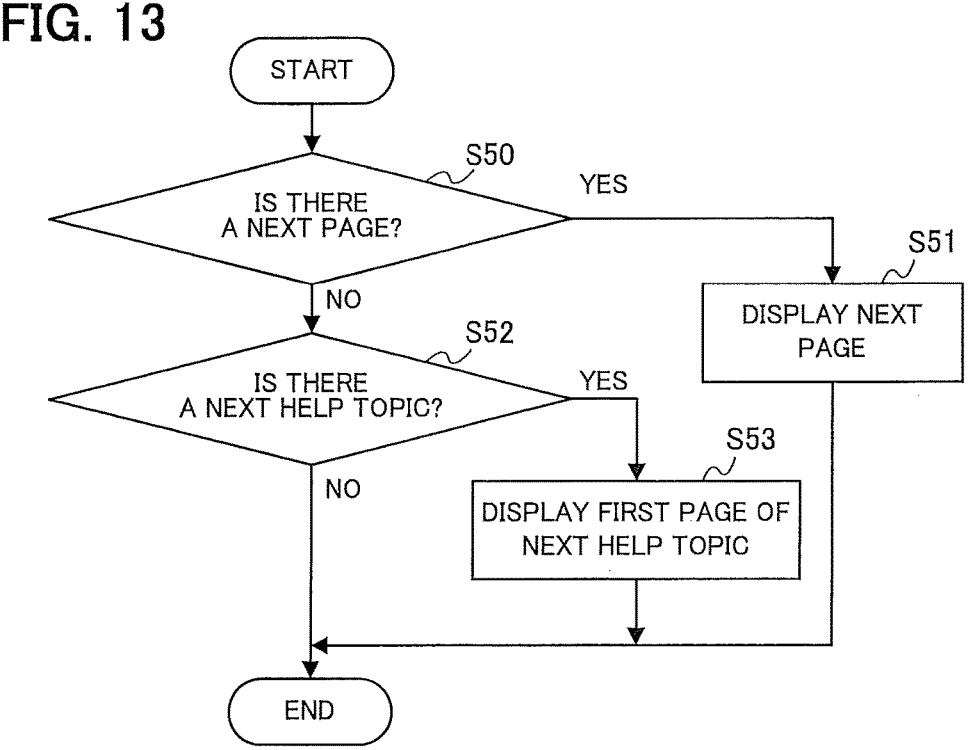
FIG. 13 is a flowchart illustrating a process performed to display a next page in the embodiment.

FIG. 13 is a flowchart illustrating the next page display process in the embodiment.

The control unit 130 determines whether or not the currently displayed help topic has a next page (S50). When the currently displayed help topic consists of a plurality of pages and the currently displayed page is not the last page, the control unit 130 determines that the currently displayed help topic has a next page (Yes in step S50) and the process proceeds to step S51. If the help topic does not have a next page (No in step S50), the process proceeds to step S52.

In step S51, the control unit 130 generates image data for the next page of the currently displayed help topic. The control unit 130 then sends the generated image data to the touch panel 120 to display the help screen of the next page.

In step S52, the control unit 130 determines whether or not there is a help topic later in the order of display than the currently displayed help topic. The control unit 130 performs this determination by, for example, referring to the display order information stored in the display order information storage unit 115. If there is a help topic later in the order of display than the currently displayed help topic (Yes in step S52) the process proceeds to step S53.

In step S53, the control unit 130 generates image data for the help screen corresponding to the first page of the help topic one position later in the order of display than the currently displayed help topic. The control unit 130 then sends the generated image data to the touch panel 120 to display that help screen.

In addition, when there is no help topic later in the order of display than the currently displayed help topic (No in step S52), the control unit 130 may generate image data for the help screen corresponding to the first or last page of the first help topic in the order of display and send the generated image data to the touch panel 120.

Figure 14:
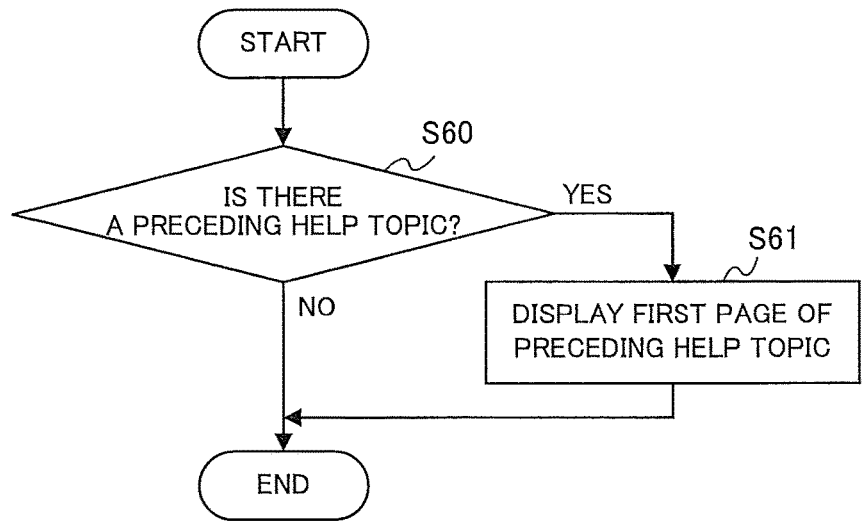
FIG. 14 is a flowchart illustrating a process performed to display preceding help information in the embodiment.

FIG. 14 is a flowchart illustrating the preceding help display process in the embodiment.

The control unit 130 determines whether or not there is a help topic earlier in the order of display than the currently displayed help topic (S60). If there is a help topic earlier in the order of display than the currently displayed help topic (Yes in step S60), the process proceeds to step S61.

In step S61, the control unit 130 generates image data for the help screen corresponding to the first page of the help topic one position earlier in the order of display than the currently displayed help topic. The control unit 130 then sends the generated image data to the touch panel 120 to display that help screen.

Figure 15:
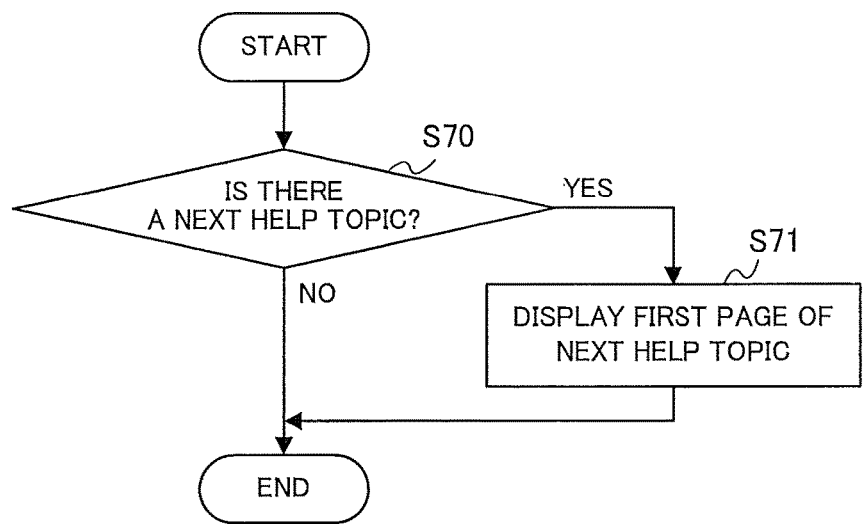
FIG. 15 is a flowchart illustrating a process performed to display next help information in the embodiment.

FIG. 15 is a flowchart illustrating the next help display process.

The control unit 130 determines whether or not there is a help topic later in the order of display than the currently displayed help topic (S70). The control unit 130 performs this determination, for example, by referencing the display order information stored in the display order information storage unit 115. If there is a help topic later in the order of display than the currently displayed help topic (Yes in step S70), the process proceeds to step S71.

In step S71, the control unit 130 generates image data for the help screen corresponding to the first page of the help topic one position later in the order of display than the currently displayed help topic. The control unit 130 then sends the generated image data to the touch panel 120 to display that help screen.

Figure 16:
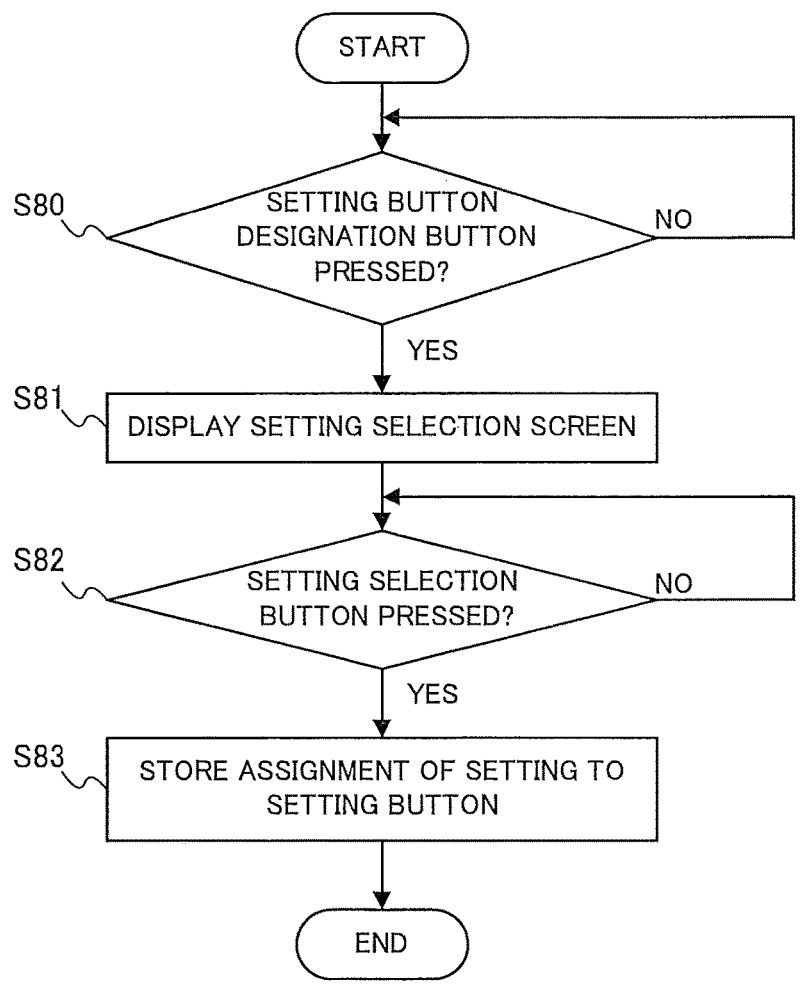
FIG. 16 is a flowchart illustrating a process performed to alter an assignment of a setting to a setting button in the embodiment.

FIG. 16 is a flowchart illustrating the process of altering the assignment of a setting to a setting button.

The description given here assumes that the setting button designation screen 160 shown in FIG. 6 is displayed on the touch panel 120.

First, the control unit 130 determines whether or not any one of the setting button designation buttons 162-167 has been pressed on the setting button designation screen 160 (S80). When one of the setting button designation buttons 162-167 is pressed (Yes in step S80), the process proceeds to step S81.

In step S81, the control unit 130 generates image data for the setting alteration screen for altering the setting assigned to the one of the setting button designation buttons 162-167 that was pressed, and sends the generated data to the touch panel 120 to display that screen. In this case, the setting alteration screen 170 shown in FIG. 7 is displayed on the touch panel 120.

Next, the control unit 130 determines whether or not any one of the setting selection buttons 171-178 has been pressed on the currently displayed setting alteration screen 170 (S82). When one of the setting selection buttons 171-178 is pressed (Yes in step S82), the process proceeds to step S83.

In step S83, the control unit 130 updates the layout information stored in the layout information storage unit 114 in such a way that the setting identified by the pressed button out of the setting selection buttons 171-178 is located at the display position corresponding to the setting button selected on the setting button designation screen 160.

For example, if setting button designation button 162 was pressed in step S80, and the setting selection button 176 for erasing edges, which is indicated as 'Edge Erase', is pressed in step S82, the setting selection screen 140#1 for the copy function shown in FIG. 8 is displayed on the touch panel 120.

When the help button 141#1 is pressed on the setting selection screen 140#1 for the copy function shown in FIG. 8, the process of displaying the help screens is performed according to the processing flow shown in FIG. 9. The first help screen to be displayed in this process shows help information corresponding to the 'Edge Erase' setting.

As described above, according to the embodiment, when help information is displayed for a setting selection screen including a plurality of settings, the user can view all the help topics page by page, and can also search for a desired help topic by skipping from one help topic to the next without having to display all pages of unnecessary help topics. The help information can therefore be viewed efficiently, in keeping with the user's skill and the usage situation.

The information processing device 100 in the embodiment described above may be a printer, a multifunction device, a facsimile device, or any other type of image forming device equipped with a touch panel.

The exemplary touch panel in the embodiment described above is a touch panel of the resistive film type, but a capacitive touch panel may be used instead.

Figure 17:
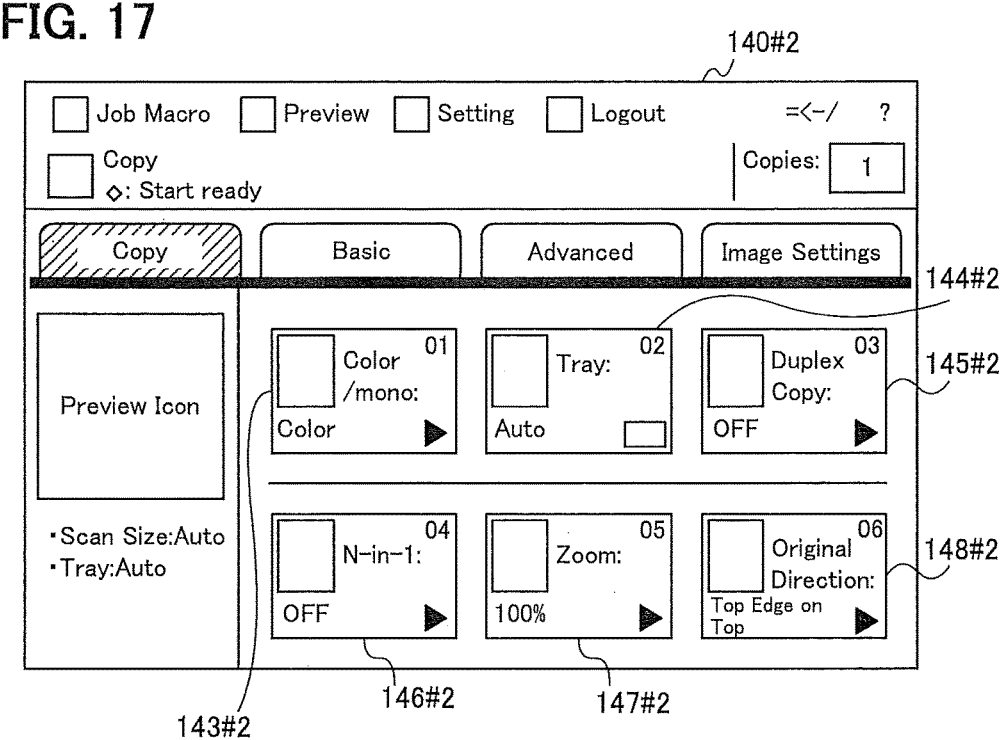
FIG. 17 schematically shows a third exemplary setting selection screen in the embodiment.

FIG. 17 schematically shows another exemplary setting selection screen displayed for the copy function on the touch panel 120.

On the setting selection screen 140#2 for the copy function, the identification numbers assigned to the setting button designation buttons 162-167 shown in the layout position indicator region 161 on the setting button designation screen 160 (FIG. 6) are displayed at the upper right sides of the setting buttons 143#2-148#2. In addition, the position where the identification numbers are displayed are not limited to the upper right sides. As long as insides of the setting buttons 143#2-148#2, any position may be allowable.

When the help button 141 is pressed, the control unit 130 may cause the touch panel 120 to display the setting selection screen 140#2.

Figure 18:
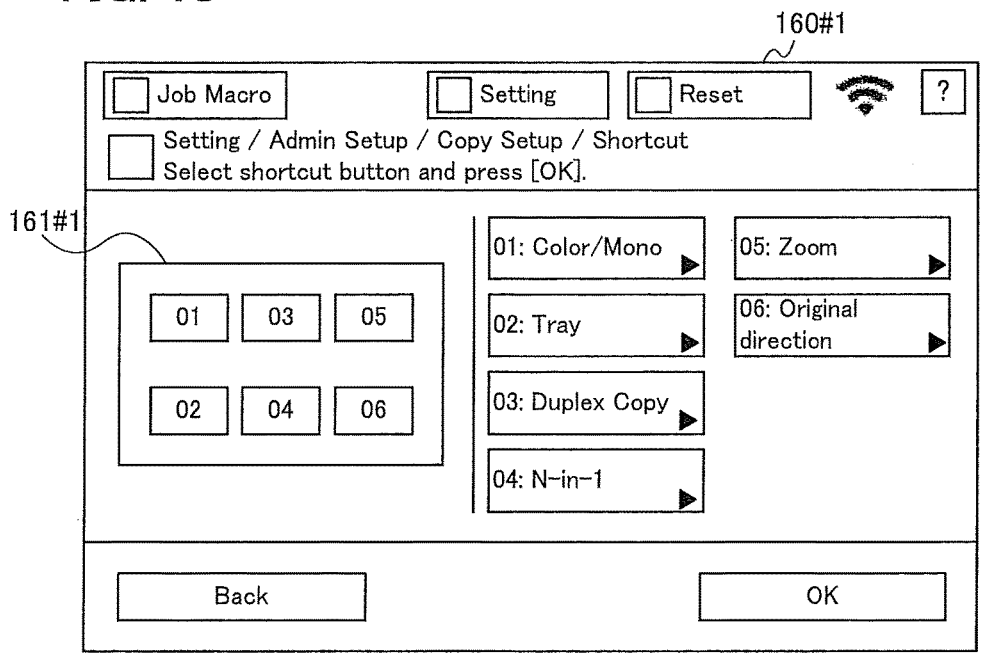
FIG. 18 schematically shows a second exemplary setting alteration screen in the embodiment.

FIG. 18 schematically shows another exemplary setting button designation screen displayed on the touch panel 120.

As shown on the setting button designation screen 160#1 in FIG. 18, the display positions in the layout position indicator region 161#1 may be changed by user operations.

The control unit 130 may accept the user operations on the touch panel 120 and cause the touch panel 120 to display the setting button designation screen 160#1.

Those skilled in the art will recognize that further variations are possible within the scope of the invention, which is defined in the appended claims.

What is claimed is:

1. An information processing device comprising:
    a storage unit for storing layout information indicating display positions of a plurality of settings on a screen;
    a display unit for displaying a setting selection screen on which the plurality of settings are arranged in the display positions indicated by the layout information, and accepting a selection of a setting to be made, for displaying help screens which contain a plurality of pages showing help information for each of the plurality of settings in an order corresponding to the display positions indicated by the layout information, and for displaying a display position alteration screen that accepts input of a command to alter at least one of the display positions of the plurality of settings; and
    a control unit for updating the layout information to indicate the display positions as altered on the display position alteration screen, for updating the setting selection screen to arrange each of the plurality of settings in the display positions indicated by the updated layout information, and for causing the display unit to display the updated setting selection screen, wherein
    the updated setting selection screen contains a help command input region for input of a command to display a help screen, and
    when input of an 'execute' command selecting the help command input region is accepted on the updated setting selection screen, the control unit updates the help screens to show the help information for each of the plurality of settings in an order corresponding to the display positions indicated by the updated layout information, and causes the display unit to display one of the updated help screens instead of the updated setting selection screen.

2. The information processing device of claim 1, wherein the display unit displays, in each of the help screens, help information pertaining to one setting included in the plurality of settings.

3. The information processing device of claim 2 wherein, in the help screens, a next help region is provided for accepting input of a command to display help information for a next setting, and when input of an 'execute' command selecting the next help region is accepted on one help screen, the display unit displays another help screen showing help information for a setting that follows a current setting corresponding to the one help screen in the order corresponding to the display positions indicated by the layout information.

4. The information processing device of claim 2 wherein, in the help screens, a preceding help region is provided for accepting input of a command to display help information for a preceding setting, and when input of an 'execute' command selecting the preceding help region is accepted on one help screen, the display unit displays another help screen showing help information for a setting that precedes a current setting corresponding to the one help screen in the order corresponding to the display positions indicated by the layout information.

5. The information processing device of claim 2, wherein the display unit divides the help information pertaining to one setting into a plurality of parts and displays a help screen showing each part of the help information on each page.

6. The information processing device of claim 5 wherein, in the help screens, a next page region is provided for accepting input of a command to display a next page of help information, and when input of an 'execute' command selecting the next page region is accepted on one help screen, the display unit displays another help screen showing a part of the help information for a next page that follows a current page corresponding to the one help screen.

7. The information processing device of claim 6 wherein, if input of the 'execute' command selecting the next page region is accepted when there is no part of the help information for the next page that follows the current page, the display unit displays another help screen for showing at least part of help information for a setting that follows a current setting corresponding to the one help screen in the order corresponding to the display positions indicated by the layout information.

8. The information processing device of claim 5 wherein, in the help screens, a preceding page region is provided for accepting input of a command to display a preceding page of help information, and when input of an 'execute' command selecting the preceding page region is accepted on one help screen, the display unit displays another help screen showing a part of the help information for a preceding page that precedes a current page corresponding to the one help screen.

9. The information processing device of claim 8 wherein, if input of the 'execute' command selecting the preceding page region is accepted when there is no part of the help information for the preceding page that precedes the current page, the display unit displays another help screen for showing at least part of help information for a setting that precedes a current setting corresponding to the one help screen in the order corresponding to the display positions indicated by the layout information.

10. An information processing method comprising:
    displaying a setting selection screen on which a plurality of settings are arranged in display positions indicated by layout information;
    displaying help screens which contain a plurality of pages showing help information for each of the plurality of settings in an order corresponding to the display positions indicated by the layout information;
    displaying a display position alteration screen that accepts input of a command to alter at least one of the display positions of the plurality of settings;
    updating the layout information to indicate the display positions as altered on the display position alteration screen;
    updating the setting selection screen to arrange each of the plurality of settings in the display positions indicated by the updated layout information;

displaying the updated setting selection screen containing a help command input region for input of a command to display a help screen;

accepting input of an 'execute' command selecting the help command input region on the updated setting selection screen;

updating the help screens to show the help information for each of the plurality of settings in an order corresponding to the display positions indicated by the updated layout information; and displaying one of the updated help screens instead of the updated setting selection screen.

\* \* \* \* \*